(12) United States Patent
Onogi et al.

(10) Patent No.: US 7,511,780 B2
(45) Date of Patent: Mar. 31, 2009

(54) ACTIVE MATRIX LIQUID CRYSTAL DISPLAY DEVICE

(75) Inventors: Tomohide Onogi, Anpachi-cho (JP); Yasuo Segawa, Kitagata-cho (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 6 days.

(21) Appl. No.: 11/976,391

(22) Filed: Oct. 24, 2007

(65) Prior Publication Data

US 2008/0100762 A1    May 1, 2008

(30) Foreign Application Priority Data

Oct. 31, 2006    (JP)    ............... 2006-296732

(51) Int. Cl.
*G02F 1/1343*    (2006.01)
(52) U.S. Cl. .................. 349/39; 349/141; 349/73; 349/38; 257/E23.145; 257/E23.142; 438/48
(58) Field of Classification Search .................. 349/38, 349/39, 74, 73, 141; 438/38; 257/E23.145, 257/E23.142
See application file for complete search history.

(56) References Cited

U.S. PATENT DOCUMENTS

| | | | | |
|---|---|---|---|---|
| 5,598,285 | A * | 1/1997 | Kondo et al. ............. | 349/39 |
| 6,008,872 | A * | 12/1999 | den Boer et al. ......... | 349/106 |
| 6,816,222 | B2 | 11/2004 | Ono et al. | |
| 6,900,862 | B2 * | 5/2005 | Do ............................ | 349/110 |
| 7,136,130 | B2 | 11/2006 | Ono et al. | |
| 7,295,268 | B2 | 11/2007 | Ono et al. | |
| 2004/0114083 | A1 * | 6/2004 | Do ............................ | 349/141 |
| 2005/0168677 | A1 * | 8/2005 | Do ............................ | 349/141 |
| 2006/0139516 | A1 * | 6/2006 | Park ......................... | 349/110 |

FOREIGN PATENT DOCUMENTS

JP    A 2001-183685    7/2001
KR    A-2002-0063498    8/2002

* cited by examiner

*Primary Examiner*—James P Hughes
(74) *Attorney, Agent, or Firm*—Epson & Berridge, PLC

(57) ABSTRACT

An active matrix liquid crystal display device includes a pixel transistor, a wiring layer, a first insulating layer, a lower electrode layer, a second insulating layer, and an upper electrode layer. The wiring layer is connected to the pixel transistor. The first insulating layer is provided on the pixel transistor and the wiring layer. The lower electrode layer is provided on the first insulating layer and used as one of a common electrode layer and a pixel electrode layer. The second insulating layer is provided on the lower electrode layer. The upper electrode layer is provided on the second insulating layer and used as the other of the common electrode layer and the pixel electrode layer. The thickness t of the second insulating layer satisfies $t<[(\epsilon_0\epsilon/W)\times\{(0.025381/P)^2/6\}]/(100\times10^{-9})$ and $t>[(\epsilon_0\epsilon/W)\times\{(0.025381/P)^2/6\}\times k\times\rho_{ON}]/\tau_{ON}$, where a display pixel has a substantially square shape and is composed of a plurality of sub pixels, a pitch at which the display pixels are arranged vertically and a pitch at which the display pixel are arranged horizontally are respectively P per 25.381 mm, the channel width of the pixel transistor is W, the on resistance per unit channel width of the pixel transistor is $\rho_{ON}$, a period of time during which a gate line and drain line of the pixel transistor are simultaneously turned on is $\tau_{ON}$, a relative dielectric constant of the second insulating layer $\epsilon$, a vacuum dielectric constant is $\epsilon_0$, a correction parameter is k. Liquid crystal molecules are driven by applying voltage between the upper electrode layer and the lower electrode layer.

16 Claims, 5 Drawing Sheets

ACTIVE MATRIX LIQUID CRYSTAL DISPLAY DEVICE

CROSS-REFERENCE TO RELATED APPLICATION

This application claims priority from Japanese Patent Application No. 2006-296732 filed in the Japanese Patent Office on Oct. 31, 2006, the disclosure of which is incorporated herein by reference in its entirety.

BACKGROUND

1. Technical Field

The present invention relates to an active matrix liquid crystal display device and, more particularly, to an active matrix liquid crystal display device that drives liquid crystal molecules by applying voltage between an upper electrode layer and a lower electrode layer that are formed on the same substrate through an insulating layer, wherein one of the upper electrode layer and the lower electrode layer is a common electrode layer and the other is a pixel electrode layer, and a plurality of openings are formed in the upper electrode layer and arranged parallel to each other so that an electric field is passed therethrough.

2. Related Art

In regard to a display type of an existing active matrix liquid crystal display device, a TN (twisted nematic) type display device has been widely used. However, the TN type display device has a limited viewing angle due to its display principle. A horizontal electric field type display device has been known as a solution for the above problem, in which a pixel electrode and a common electrode are formed on the same substrate, voltage is applied between the pixel electrode and the common electrode to thereby generate an electric field that is substantially parallel to the substrate, and liquid crystal molecules are thus driven mainly within a plane parallel to the surface of the substrate.

In the horizontal electric field type display device, an IPS (in plane switching) mode display device and an FFS (fringe field switching) mode display device are known. In the IPS mode display device, a comb-shaped pixel electrode and a comb-shaped common electrode are arranged in combination. In the FFS mode display device, an upper electrode layer and a lower electrode layer are formed via an insulating layer, in which one of the upper electrode layer and the lower electrode layer is used as a common electrode layer and the other is used as a pixel electrode layer, and then openings, such as slits, are formed in the upper electrode layer so that an electric field is passed therethrough.

In regard to the insulating layer interposed between the upper electrode layer and the lower electrode layer, Japanese Unexamined Patent Application Publication No. 2001-183685 describes an example of an insulating layer, which is constituted of a single surface protection insulating layer for TFT or an example of an insulating layer, which is constituted of a gate insulating film for TFT, interposed between a pixel electrode and a common signal electrode, which are made of upper and lower two ITO layers.

In the active matrix liquid crystal display device, a holding capacitor is provided for restricting changes in electric potentials of pixels when liquid crystals are driven. In the case of FFS mode display device, using an insulating layer interposed between an upper electrode layer and a lower electrode layer, a capacitor formed at the portion at which the upper electrode layer overlaps the lower electrode layer may be used as a holding capacitor. However, when the capacitor formed at the portion at which the upper electrode layer overlaps the lower electrode layer is used as the holding capacitor, the capacitance of the holding capacitor varies depending on the pixel density of the liquid crystal display device. For example, as the pixel density is increased and the area of one pixel on the plane is reduced, the capacitance of each holding capacitor is reduced. In contrast, as the pixel density is reduced and the area of one pixel on the plane is increased, the capacitance of each holding capacitor is increased.

SUMMARY

To prevent this situation, it is conceivable that the thickness of an insulating layer interposed between the upper electrode and the lower electrode is changed in accordance with the pixel density. However, when the gate insulating film for TFT, which is one of examples described in JP-A-2001-183685, is used as an insulating film interposed between the upper electrode layer and the lower electrode layer, the thickness of the gate insulating film for TFT is an important parameter in connection with characteristics of TFT, so that it cannot be changed easily. In addition, the surface protection insulating layer for TFT, which is the other example described above, when excessively thinned, may influence reliability. Other than the above, it is conceivable that a planarizing insulating film is provided on the surface protection insulating layer for TFT. However, this film is made of acrylic, or the like, so that the film does not have a high quality.

Thus, an insulating film used in an existing configuration of an active matrix liquid crystal display device is not suitable for forming a holding capacitor that is applicable in a wide range of pixel density in the FFS mode display device. Then, it may be considered that a lower electrode layer, an insulating film layer and an upper electrode layer are sequentially formed on a planarizing insulating film, and a holding capacitor is formed using the insulating film. When this structure is termed as an overlayer structure, it needs to improve the capacitance of a holding capacitor in the overlayer structure, and to improve display quality in the FFS mode display device.

An advantage of some aspects of the invention is that it provides an FFS mode active matrix liquid crystal display device in which holding capacitors are formed using an overlayer structure and the display quality can be improved through enhancement of the capacitances of the holding capacitors.

Aspects of the invention are based upon conditions of improved display quality which is obtained by considering both conditions of holding a pixel potential when a holding capacitor is formed using an overlayer structure and conditions of restricting the influence of changes in electric potential of signal lines in the FFS mode active matrix liquid crystal display device. The results are implemented by the following manners.

A first aspect of the invention provides an active matrix liquid crystal display that includes a pixel transistor, a wiring layer, a first insulating layer, a lower electrode layer, a second insulating layer, and an upper electrode layer. The wiring layer is connected to the pixel transistor. The first insulating layer is provided on the pixel transistor and the wiring layer. The lower electrode layer is provided on the first insulating layer and used as one of a common electrode layer and a pixel electrode layer. The second insulating layer is provided on the lower electrode layer. The upper electrode layer is provided on the second insulating layer and used as the other of the common electrode layer and the pixel electrode layer. The thickness t of the second insulating layer satisfies $t<[(\epsilon_0\epsilon/W)\times\{(0.025381/P)^2/6\}]/(100\times10^{-9})$ and $t>[(\epsilon_0\epsilon/W)\times\{(0.025381/P)^2/6\}\times k\times\rho_{ON}]/\tau_{ON}$, where a display pixel has a substantially square shape and is composed of a plurality of sub pixels, a pitch at which the display pixels are arranged vertically and a pitch at which the display pixel are arranged horizontally are respectively P per 25.381 mm, the channel width of the pixel transistor is W, the on resistance per unit channel width of the pixel transistor is $\rho_{ON}$, a period of time during which a gate line and drain line of the pixel transistor are simultaneously turned on is $\tau_{ON}$, a relative dielectric constant of the second insulating layer $\epsilon$, a vacuum dielectric constant is $\epsilon_0$, a correction parameter is k. Liquid crystal molecules are driven by applying voltage between the upper electrode layer and the lower electrode layer.

A second aspect of the invention provides an active matrix liquid crystal display device that includes a pixel transistor, a wiring layer, a first insulating layer, a lower electrode layer, a second insulating layer, and an upper electrode layer. The wiring layer is connected to the pixel transistor. The first insulating layer is provided on the pixel transistor and the wiring layer. The lower electrode layer is provided on the first insulating layer and is used as one of a common electrode layer and a pixel electrode layer. The second insulating layer is provided on the lower electrode layer. The upper electrode layer is provided on the second insulating layer and is used as the other of the common electrode layer and the pixel electrode layer. The thickness t of the second insulating layer ranges from 90 nm to 2400 nm under conditions that, when a display pixel has a substantially square shape and is composed of a plurality of sub pixels, a pitch at which the display pixels are arranged vertically and a pitch at which the display pixel are arranged horizontally are respectively P per 25.381 mm, a first condition where a pixel holding capacitor relative to the pixel transistor P exceeds 200 fF when the P ranges from 100 to 400 is satisfied and a second condition where a signal line capacitor relative to a drain line of the pixel transistor exceeds ten times the pixel holding capacitor is satisfied. Liquid crystal molecules are driven by applying voltage between the upper electrode layer and the lower electrode layer.

In addition, in the active matrix liquid crystal display device according to the above aspects of the invention, the first insulating layer may be formed of transparent insulating resin, and the second insulating layer may be formed of a silicon nitride that is produced in a low-temperature process. Furthermore, in the active matrix liquid crystal display device according to the above aspects of the invention, the upper electrode layer may have a slit that has a closed shape. Moreover, in the active matrix liquid crystal display device according to the above aspects of the invention, the upper electrode layer may have an opening having a comb-shape. Also, in the active matrix liquid crystal display device according to the above aspects of the invention, a capacitor may be formed by the lower electrode layer, a second insulating layer formed on the lower electrode layer and the upper electrode layer formed on the second insulating layer. Further, in the active matrix liquid crystal display device according to the above aspects of the invention, the upper electrode layer may be a common electrode layer. Yet furthermore, in the active matrix liquid crystal display device according to the above aspects of the invention, the upper electrode layer may be a pixel electrode layer.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described in detail with reference to the accompanying drawings. An FFS mode liquid crystal display device that performs display composed of three colors, that is, red (R), green (G), blue (B) will be described. Of course, for example, the display device may perform display composed of multicolor that further includes C (cyan), or the like, in addition to R, G, B or may simply perform monochrome display. In addition, the shape, structure, material, and the like, described below, are an example for illustration and may be modified in accordance with application of the liquid crystal display device, where appropriate.

The configuration of the FFS mode active matrix liquid crystal display device will be described first, and then the improvement and/or optimization of a holding capacitor will be described.

Figure 1:
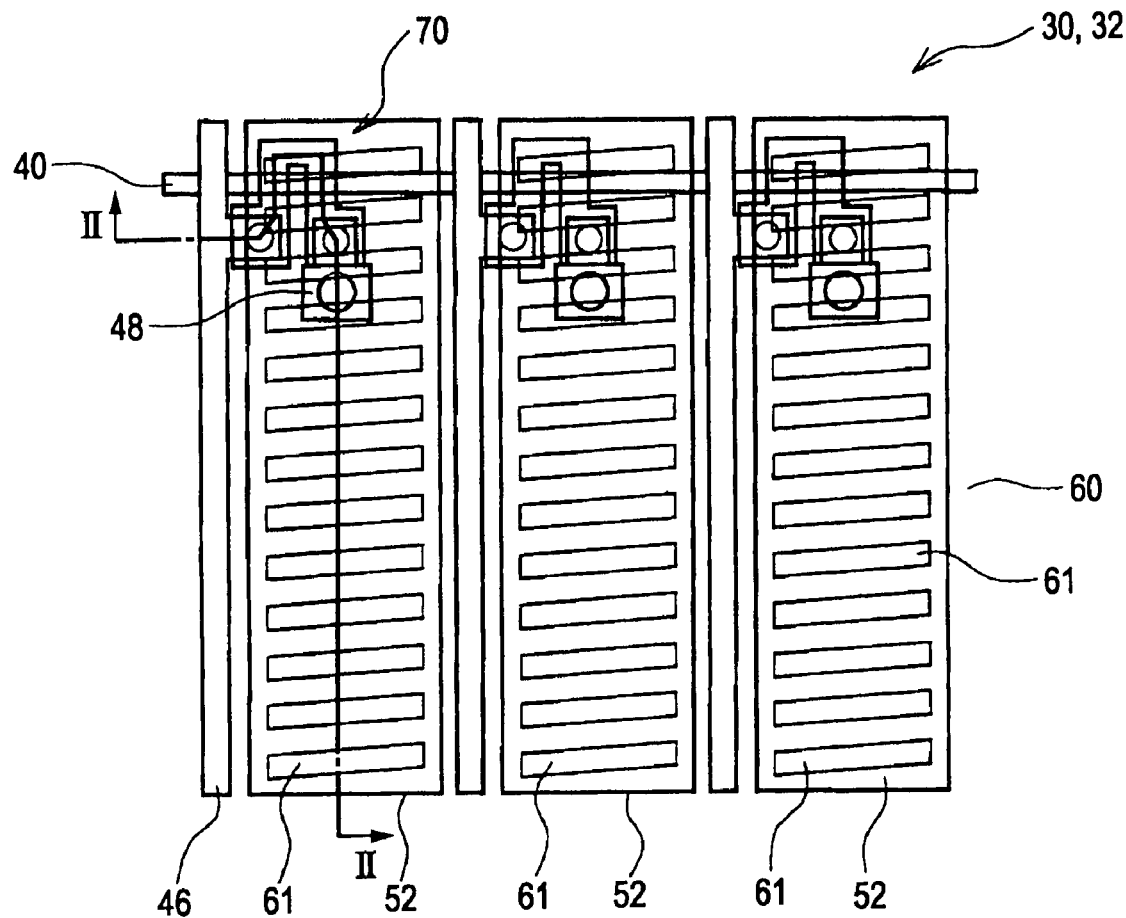
FIG. 1 is a view showing a planar configuration of a display pixel in a display area of an FFS mode liquid crystal display device in which an upper electrode layer is used as a common electrode and slits are formed therein according to an embodiment of the invention.
Figure 2:
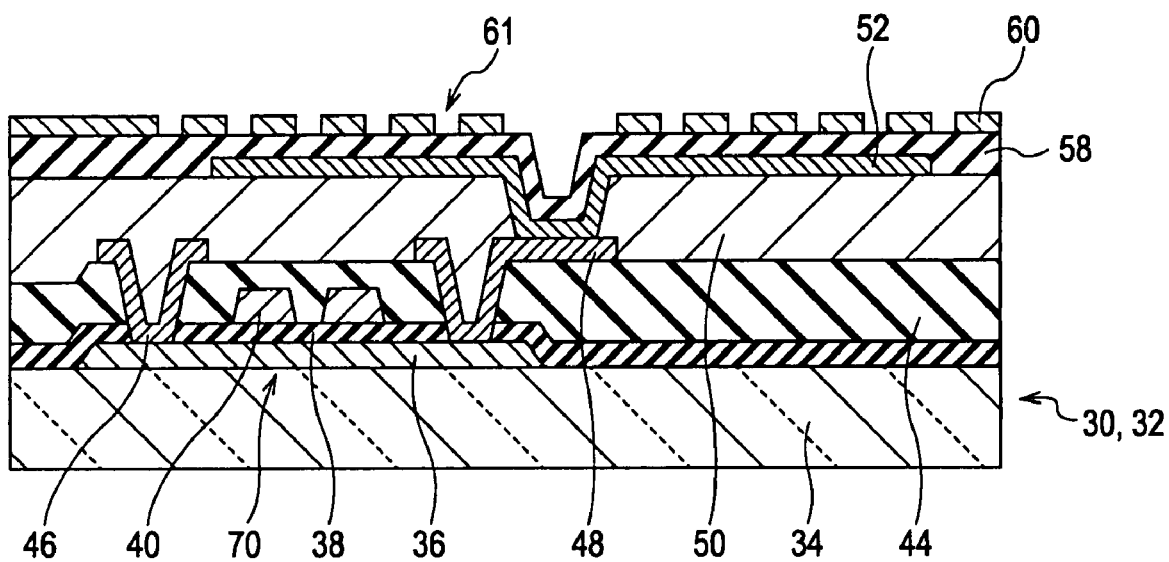
FIG. 2 is a cross-sectional view that is taken along the line II-II in FIG. 1.

FIG. 1 is a view showing a planar configuration of a display pixel, that is, three sub pixels corresponding to three colors, in a display area when display is performed with three color structure composed of R, G, B in an FFS mode active matrix liquid crystal display device 30. The FFS mode liquid crystal display device 30 is configured so that a pixel electrode and a common electrode are arranged on an array substrate 32, a color filter, a black matrix, and the like, are arranged on an opposite substrate that is opposed to the array substrate 32, and a liquid crystal molecules layer is sealed between the substrates. FIG. 1 is a plan view of the array substrate 32 as viewed from the opposite substrate and is virtually, because elements arranged on the opposite substrate are omitted, a plan view of the array substrate 32. FIG. 2 is a cross-sectional view taken along the line II-II in FIG. 1 with enlarged in the thickness direction, and only shows the array substrate 32.

As shown in FIG. 1, in the liquid crystal display device 30, a plurality of drain wirings 46 each extend linearly (extend in a vertical direction in an example shown in FIG. 1), and a plurality of gate wirings 40 is arranged to extend in a direction that intersects with the direction in which the drain wirings 46 extend (that is, a perpendicular direction or a horizontal direction in the example shown in FIG. 1). Separate regions that are defined by the plurality of drain wirings 46 and the plurality of gate wirings 40 are pixel array regions, and three pixel array regions corresponding to three colors composed of R, G, B are shown in FIG. 1. Here, pixels are counted in color imaging units, and this unit is defined as a display pixel. Therefore, the pixel array region herein means the region of a sub pixel. Hereinafter, the word "pixel" means a sub pixel unit unless otherwise stated, and a unit of pixels that the plurality of sub pixels are combined to form a display pixel is termed a display pixel. Note that the common electrode 60 is arranged over the entire surface of the array substrate 32 or over the plurality of pixels and, therefore, FIG. 1 does not show the outline of the common electrode 60 except the shape lines of the slits 61.

Here, in the embodiment, a plurality of drain wirings 46 are arranged with the same pitch. In addition, the width of each drain wiring 46 (the size of each drain wiring 46 in a direction in which the drain wirings are arranged) is the same as well. Furthermore, FIG. 1 shows that the shape of each drain wiring 46 is linear. However, for example, the drain wiring 46 may locally have a curved portion and extend in the above extending direction as a whole. Moreover, the pixel array may be formed in a stripe array, a delta array, a mosaic array, or the like.

A pixel TFT 70 is arranged in each of the pixel arrangement regions which are defined by the drain wirings 46 and the gate wirings 40. In the embodiment shown in FIG. 1, in each of the pixel TFTs 70, a semiconductor layer 36 (see FIG. 2) extends to form a substantially U-shape (in the drawing, the substantially U-shape is inverted upside down), and the gate wirings 40 extend to intersect perpendicularly with the direction in which the drain wirings 46 are arranged across two arm portions of that substantially U-shape semiconductor layer 36. In this configuration, the source electrode of each pixel TFT 70, together with the drain electrode that is connected to the drain wiring 46, is positioned on the same side relative to the gate wiring 40. In this manner, the pixel TFT 70 has a configuration in which the gate wiring 40 intersects with the semiconductor layer 36 twice between the source and drain of the semiconductor layer 36, that is, two gate electrodes are provided between the source and drain of the semiconductor layer 36.

Thus, the drain of the pixel TFT 70 is connected to the nearest drain wiring 46, while, on the other hand, the source of the pixel TFT 70 is connected to the pixel electrode 52 through the source electrode 48. The pixel electrode 52 is provided for each pixel and is a plate-like electrode that is connected to the source of the pixel TFT 70 of each pixel. FIG. 1 shows the pixel electrode 52 having a rectangular shape.

The common electrode 60, as described above, is arranged on the array substrate 32. However, depending on circumstances, the common electrode 60 may be provided for each pixel. In the case of that configuration, a common electrode wiring is arranged to connect the common electrodes 60 of the pixels. The common electrode 60 is formed so that slits 61, which serve as openings, are formed in a transparent electrode film layer. Each of the slits 61, when voltage is applied between the pixel electrode 52 and the common electrode 60, passes electric field and has the function of generating a horizontal electric field that is mainly parallel to the surface of the substrate.

An alignment layer is arranged on the common electrode 60 and a rubbing process is performed as an alignment process. A rubbing direction may be, for example, a direction parallel to the gate wiring 40 shown in FIG. 1. The slits 61 of the common electrode 60 are formed so that the direction in which the long side of each slit 61 extends is slightly inclined relative to the rubbing direction. For example, the direction in which the long side of each slit 61 may be formed to be slightly inclined at an angle of about 5 degrees relative to the rubbing direction. The alignment layer is formed on the common electrode 60 and the rubbing process is then performed, so that the array substrate 32 is completed.

Next, with reference to the cross-sectional view of FIG. 2, a configuration of the array substrate 32 in the FFS mode liquid crystal display device will be described. FIG. 2 is, as described above, a cross-sectional view that is taken along the line II-II in FIG. 1, showing elements in one of the pixels.

The array substrate 32 includes a transparent substrate 34, the semiconductor layer 36, a gate insulating film 38, the gate wiring 40, an interlayer insulating film 44, the drain wiring 46, the source electrode 48, a planarizing insulating film 50, the pixel electrode 52, an FFS insulating film 58, and the common electrode 60.

The transparent substrate 34 is, for example, formed of glass. The semiconductor layer 36 is, for example, formed of polysilicon and arranged on the transparent substrate 34. The gate insulating film 38 is, for example, formed of silicon oxide, silicon nitride, or the like, and arranged on the transparent substrate 34 so as to cover the semiconductor layer 36. The gate wiring 40 is, for example, formed of Mo, Al, or the like, and arranged on the gate insulating film 38 so as to be opposed to the semiconductor layer 36. The gate wiring 40 forms the pixel TFT 70 in cooperation with the gate insulating film 38 and the semiconductor layer 36. Note that the gate wiring 40 may also be termed a scanning line.

The interlayer insulating film 44 is, for example, formed of silicon oxide, silicon nitride, or the like, and arranged on the gate insulating film 38 so as to cover the gate wiring 40, or the like. Contact holes are formed to extend through the interlayer insulating film 44 and the gate insulating film 38 and provided at positions corresponding to the source and drain of the pixel TFT 70 in the semiconductor layer 36. The drain wiring 46 is, for example, formed of metal, such as Mo, Al, or Ti. The drain wiring 46 is arranged on the interlayer insulating film 44 and connected through one of the contact holes to the semiconductor layer 36. Note that the drain wiring may also be termed as a signal line. The source electrode 48 is, for example, formed of the same material as that of the drain wiring 46. The source electrode 48 is arranged on the interlayer insulating film 44 and connected through the other contact hole to the semiconductor layer 36.

Here, in the semiconductor layer 36, a portion to which the drain wiring 46 is connected is termed as the drain of the pixel TFT 70 and a portion to which the pixel electrode 52 is connected through the source electrode 48 is termed as the source of the pixel TFT 70; however, the term "drain" and "source" used may be exchanged in contrast to the above.

The planarizing insulating film 50 is, for example, formed of insulating transparent resin, or the like, such as acrylic and arranged on the interlayer insulating film 44 so as to cover the drain wiring 46 and the source electrode 48. A contact hole is formed on the source electrode 48 to extend through the planarizing insulating film 50.

The pixel electrode 52 is, for example, formed of transparent conductive material, such as ITO (indium thin oxide). The pixel electrode 52 is arranged on the planarizing insulating film 50 and connected through the above contact hole to the source electrode 48.

The FFS insulating film 58 is an insulating film layer that is arranged between the pixel electrode 52 and the common electrode 60. The FFS insulating film 58 is, for example, formed of silicon nitride and arranged on the planarizing insulating film 50 so as to cover the pixel electrode 52. Note that, when the planarizing insulating film 50 is formed of resin, the FFS insulating film 58 needs to be formed in a low-temperature process.

The common electrode 60 is, for example, formed of transparent conductive material, such as ITO. The common electrode 60 is arranged on the FFS insulating film 58 and connected to a common electrode wiring (not shown). The common electrode 60 is opposed to the pixel electrode 52 via the FFS insulating film 58. The common electrode 60 has the plurality of slits 61 formed at positions that are opposed to the pixel electrode 52. Each of the slits 61 is a thin elongated and closed opening having a major axis oriented in a direction that is slightly inclined relative to the direction in which the gate wiring 40 extends. The angle of this inclination is set in conjunction with a rubbing angle in the alignment process.

The alignment layer (not shown) is arranged on the common electrode 60. The alignment layer is a layer that has a function of initially aligning liquid crystal molecules. The alignment layer is, for example, used by performing a rubbing process on an organic film made of polyimide, or the like.

Thus, the common electrode 60, which is an upper electrode layer, and the pixel electrode 52, which is a lower electrode layer, are formed on the planarizing insulating film 50 above the same transparent substrate 34 via the FFS insulating film 58, which is an insulating layer. For example, the upper and lower electrode layers, the FFS insulating film, and the planarizing insulating film are turned on the same major surface of the substrate. As described above, this structure may be termed as an overlayer structure. The slits 61 are formed in the common electrode 60 serving as the upper electrode layer. Then, when voltage is applied between the common electrode 60 and the pixel electrode 52 serving as the lower electrode layer, it is possible to generate a horizontal electric field that is mainly parallel to the surface of the substrate and thereby to drive liquid crystal molecules via the alignment layer. That is, the FFS mode active matrix liquid crystal display device 30 is configured using the overlayer structure.

In the above embodiment, via the FFS insulating film 58, the lower electrode layer serves as the pixel electrode 52 and the upper electrode layer serves as the common electrode 60, and the slits 61 are formed in the common electrode 60. However, it is applicable that the lower electrode layer serves as the common electrode 60 and the upper electrode layer serves as the pixel electrode 52.

Figure 3:
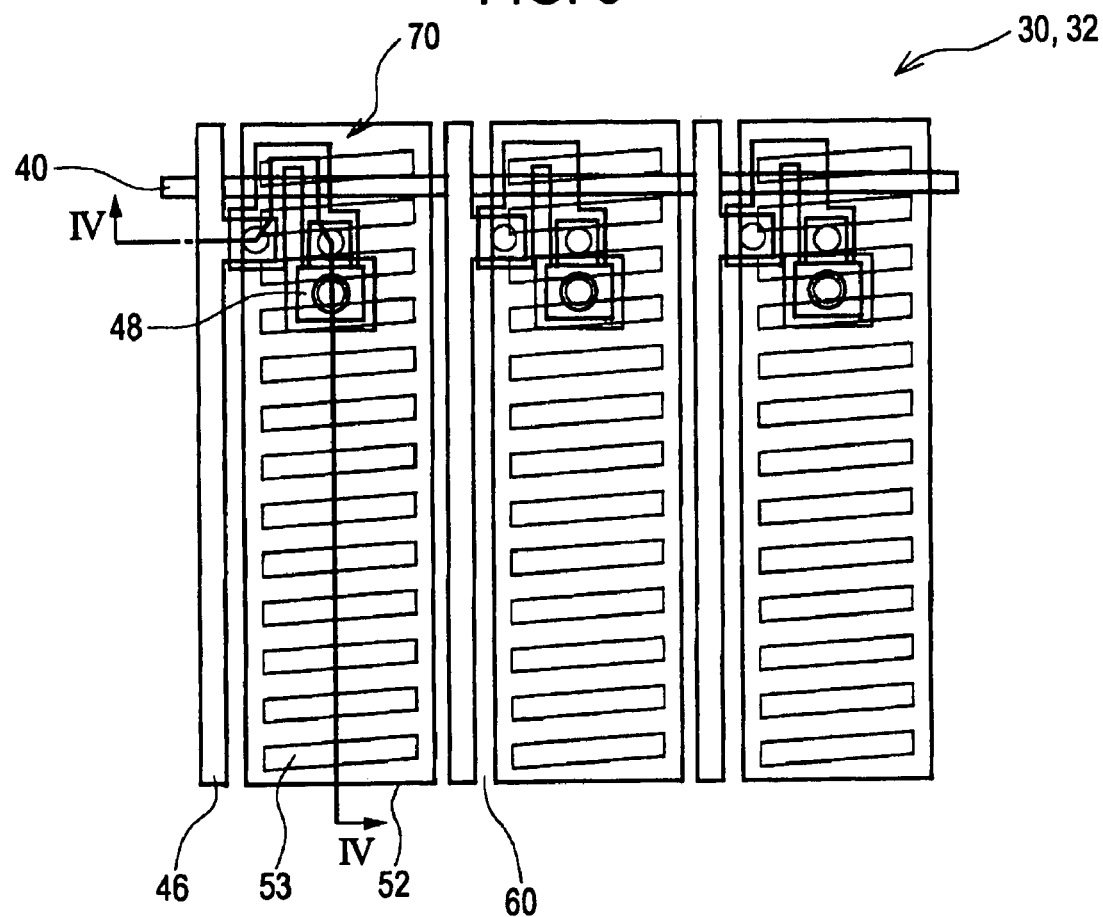
FIG. 3 is a view showing a planar configuration of a display pixel in a display area of an FFS mode liquid crystal display device in which an upper electrode layer is used as a pixel electrode and slits are formed therein according to an embodiment of the invention.
Figure 4:
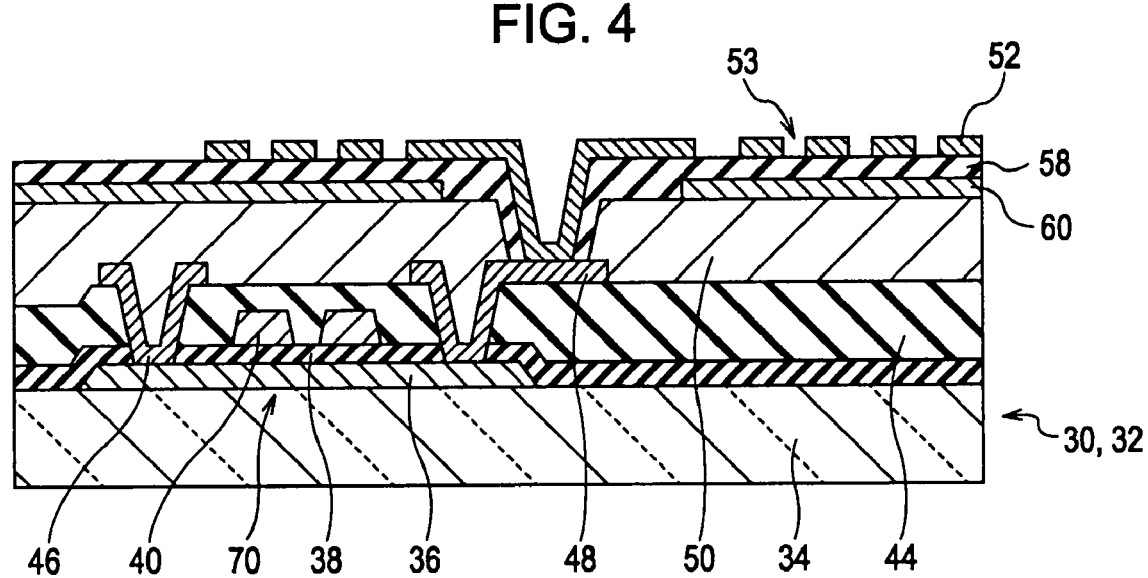
FIG. 4 is a cross-sectional view that is taken along the line IV-IV in FIG. 3.

FIG. 3 and FIG. 4 are views of a configuration of the liquid crystal display device 30 in which the lower electrode layer serves as the common electrode 60, the upper electrode layer serves as the pixel electrode 52, and slits 53 are formed in the pixel electrode 52. FIG. 3 and FIG. 4 correspond to FIG. 1 and FIG. 2, respectively, and specifically show the configuration of the array substrate 32. The same reference numerals used in FIG. 3 and FIG. 4 denote the same or similar components to those shown in FIG. 1 and FIG. 2, and a specific description thereof is omitted.

When the upper electrode layer serves as the pixel electrode 52, as shown in FIG. 4, the pixel electrode 52 that is connected to the source electrode 48 is arranged on the FFS insulating film 58. Then, the slits 53 are formed in the pixel electrode 52 that is an electrode of the array substrate 32, disposed on the outermost surface side. Each of the slits 53, as described in conjunction with FIG. 1 and FIG. 2, is a thin elongated and closed opening having a major axis oriented in a direction that is slightly inclined relative to the direction in which the gate wiring 40 extends. In addition, the common electrode 60, which serves as the lower electrode layer, is arranged over the entire surface of the array substrate 32 or arranged to extend over the plurality of pixels.

Further, in the above embodiment, the slit, which is a thin elongated open groove, is described as the opening formed in the upper electrode layer so that an electric field is passed therethrough. However, it is applicable that the upper electrode structure is formed into a comb-shape or a palisade-shape. In this case, the electric field passes through an opening formed in the comb-shape or the palisade-shape.

The following will describe improvement and/or optimization of a holding capacitor in the FFS mode active matrix liquid crystal display device that uses an overlayer structure with reference to FIG. 5 to FIG. 9.

Figure 5:
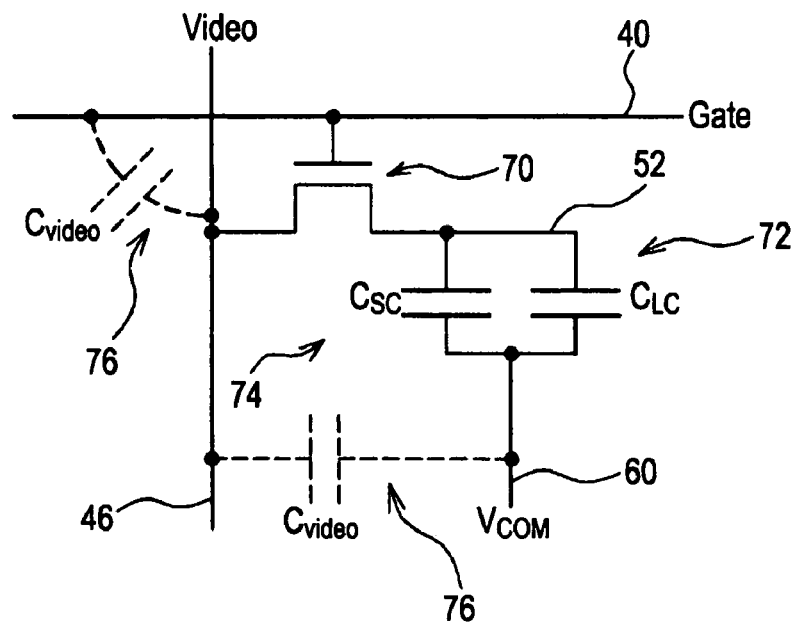
FIG. 5 is an equivalent circuit for illustrating an operation of each pixel in the an active matrix liquid crystal display device according to the embodiment of the invention.

FIG. 5 is an equivalent circuit for illustrating an operation of a pixel of the active matrix liquid crystal display device. Here, various capacitors related to the pixel TFT 70 are shown. A gate wiring (Gate) 40 is connected to the gate of the pixel TFT 70, and a drain wiring (Video) 46 is connected to the drain, of the pixel TFT 70. The gate wiring 40 is a scanning line that is supplied with a selection signal, and the drain wiring 46 is a signal line that is supplied with a video signal. Then, the pixel electrode 52 is connected to the source of the pixel TFT 70.

Here, the capacitors present between the pixel electrode 52 and the common electrode (VCOM) 60 include a liquid crystal capacitor $C_{LC}$ (72) corresponding to a capacitor of liquid crystal molecules and a holding capacitor $C_{SC}$ (74). Note that, in the equivalent circuit shown in FIG. 5, the liquid crystal capacitor 72 and the holding capacitor 74 are components of one pixel, that is, one sub pixel.

In addition, signal line capacitors (Cvideo) 76 are formed between the drain wiring 46 and the common electrode 60 and between the drain wiring 46 and the gate wiring 40 via the interlayer insulating film 44 described in FIG. 2, or the like. In the equivalent circuit shown in FIG. 5, the signal line capacitor 76 related to the drain wiring 46 is a component of one drain wiring 46 connected to the drain of the corresponding pixel TFT 70. That is, where n gate wirings 40 are connected to one drain wiring 46 and the common electrode 60 is arranged to extend over m pixels, the signal line capacitor 76 is the sum of a capacitor component formed between one drain wiring 46 and n gate wirings 40 and a capacitor component formed between one drain wiring 46 and the common electrode 60 arranged to extend over m pixels.

In such an equivalent circuit, when a scanning line driving circuit (not shown) selects one scanning line, for example, the gate wiring 40 shown in FIG. 5, the pixel TFT 70 enters a conductive state. Then, a video signal is supplied from the drain wiring 46 to the pixel electrode 52, and an electric charge corresponding to a difference in electric potential between the pixel electrode 52 and the common electrode 60 is stored in the liquid crystal capacitor 72 and the holding capacitor 74. Since the pixel TFTs 70 connected to the gate wirings 40 that are not selected are in an non-conductive state, an electric charge stored in the holding capacitor 74 is held.

Here, when the capacitance of the holding capacitor 74 is small, the potential of pixel changes due to a leakage current of the pixel TFT 70, or the like, during a holding period and a voltage applied to liquid crystal also changes. Thus, there is a possibility that a decrease in contrast and/or defective display, such as cross-talk, occurs. On the other hand, when the holding capacitor is excessively large, a sufficient electric charge is not attained in the holding capacitor 74 during a period of electric charge, that is, one horizontal scanning period, or redistribution of electric charge between the holding capacitor 74 and the signal line capacitor 76 becomes large. Thus, there is a possibility that the electric potential of the drain wiring 46 itself changes. Therefore, when the electric potential of the pixel electrode has not attained a desired level of electric potential, the pixel electrode enters a holding state. There is a possibility that a defective display such as a decrease in contrast or display chrominance non-uniformity occurs. That is, the holding capacitor 74 needs to have an appropriate capacitance that is determined on the basis of holding time, a leakage current of the pixel TFT, or the like, and needs to be appropriately small in comparison with the signal line capacitor.

Here, the holding capacitor 74 is a capacitor that is formed between the pixel electrode 52 and the common electrode 60. As described above, since the FFS insulating film 58 is interposed between the pixel electrode 52 and the common electrode 60, the holding capacitor 74 is formed of a portion at which the pixel electrode 52 overlaps the common electrode 60 with the FFS insulating film 58 interposed therebetween. Furthermore, since, in the FFS mode display device, the slits or comb-shaped openings are formed in the upper electrode layer of the array substrate 32, disposed on the outermost surface side, the upper electrode layer is configured so that electrode portions, which are conductive portions, and openings, from which conductive portions are removed, are alternately arranged.

Figure 6:
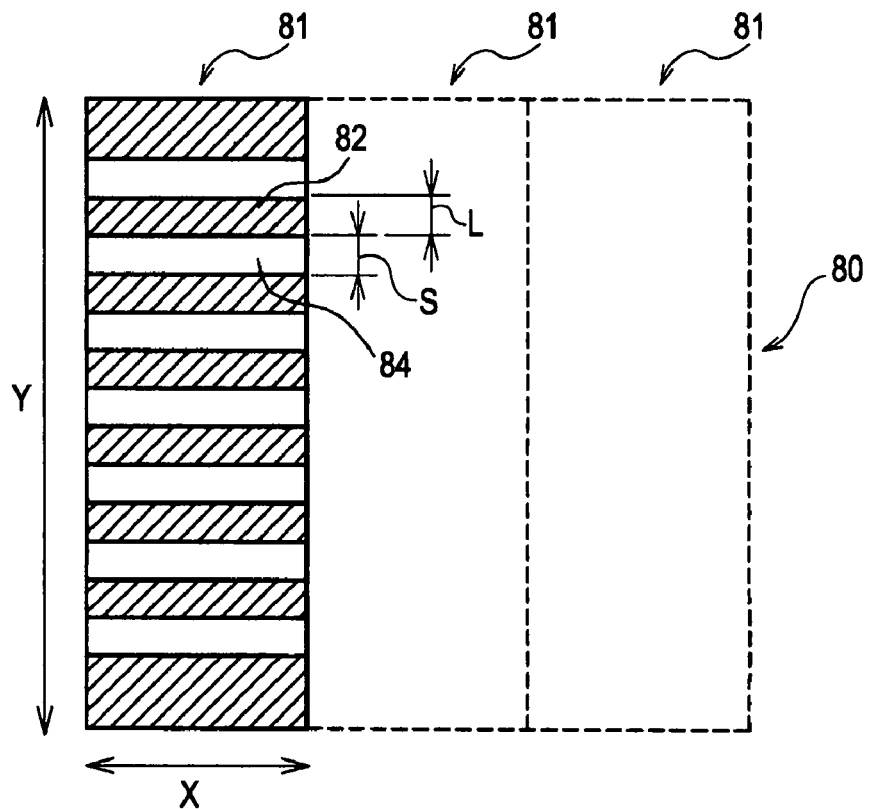
FIG. 6 is a schematic view showing electrode portions and openings in a sub pixel when each of display pixels are composed of three sub pixels according to the embodiment of the invention.

FIG. 6 is a schematic view showing electrode portions 82 and openings 84 in one pixel 81 when each display pixel 80 is composed of three sub pixels, that is, the three pixels 81, according to the embodiment of the invention. In the portion in which the electrode portions 82 and the openings 84 are alternately arranged, the width of the minor axis of each opening 84 is defined as S, and the width of each electrode portion 82 serving as the conductive portion, which is an interval between the adjacent openings 84, is defined as L. Hereinafter, S is termed as an electrode interval, and L is termed as an electrode width. Here, the openings 84 correspond to the above described slits 61, 53 or a comb-shaped opening.

Using a model shown in FIG. 6, it is possible to calculate the capacitance of a holding capacitor formed in each pixel 81. As shown in FIG. 6, the length of the pixel 81 is Y, the width of the pixel 81 is X, and the shape of the display pixel 80 that is composed of three pixels 81 is square, which is generally used. That is, Y=3X. Then, the pixel density in the display area is P display pixels per 25.381 mm (1 inch). In addition, the number of the electrode portions 82 per pixel 81 is n, the thickness of the FFS insulating film is $t_{FFS}$, the relative dielectric constant thereof is $\epsilon_{FFS}$, and the vacuum dielectric constant is $\epsilon_0$.

Using the pixel density P and conversion of 1 inch=25.381 mm, Y=(0.025381/P)(m) and x=(0.025381/3P)(m), and the number of the electrode portions 82 is n=Y/(L+S). Thus, the capacitance of the holding capacitor $C_{SC}$ per pixel 81 is given by $C_{SC}=(\epsilon_0\epsilon_{FFS}/t_{FFS})\times nLX=(\epsilon_0\epsilon_{FFS}/t_{FFS})\times\{(0.025381/P)/(L+S)\}\times L\times(0.025381/3P)$.

Figure 7:
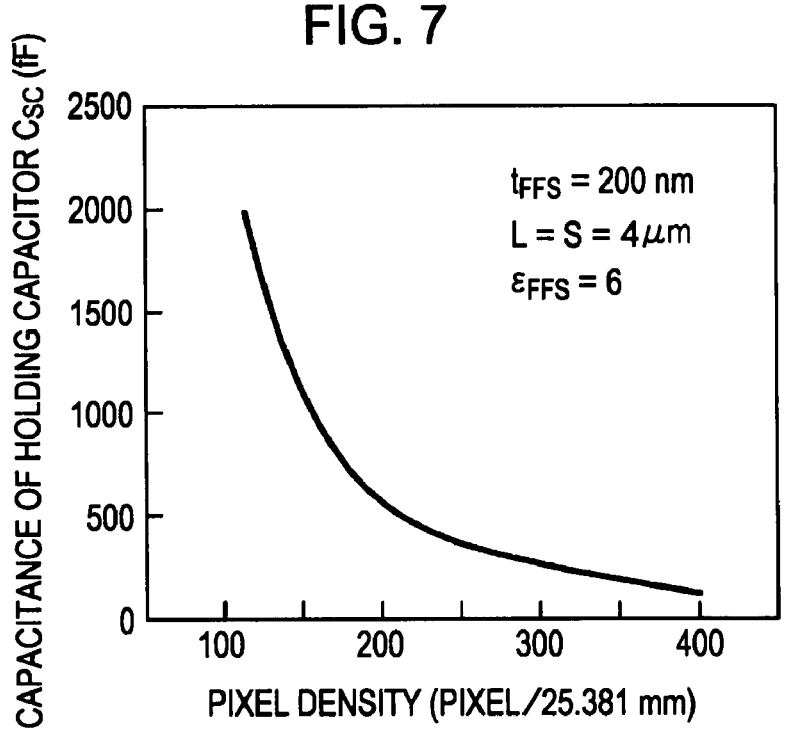
FIG. 7 is a graph showing an example when the relationship between the pixel density P and the capacitance of a holding capacitor $C_{SC}$ is calculated according to the embodiment of the invention.

FIG. 7 is a graph showing the results when the relationship between the pixel density P and the capacitance of the holding capacitor $C_{SC}$ is calculated where $\epsilon_{FFS}$=6, $t_{FFS}$=200 nm, L=S=4 μm. As is understood from FIG. 7, as the pixel density P increases, the capacitance of the holding capacitor $C_{SC}$ sharply reduces. In contrast, as the pixel density P reduces, the capacitance of the holding capacitor $C_{SC}$ sharply increases. Thus, when the thickness of the $t_{FFS}$ is constant, the capacitance of the holding capacitor $C_{SC}$ becomes insufficient or excessive in accordance with the change in pixel density. This is one of problems to be solved by the invention.

The setting of $t_{FFS}$ in accordance with the pixel density P will be described with reference to FIG. 8 and FIG. 9. As described above, the holding capacitor needs to have an appropriate capacitance that is determined on the basis of holding time, a leakage current of the pixel TFT, or the like, and needs to be appropriately small in comparison with the signal line capacitor. In order to hold the electric potential of the pixel to satisfy the former requirement, empirically, when the channel width of the pixel TFT is around 2 μm, it is sufficient for the holding capacitor ($C_{SC}$) to have a capacitance of 200 fF or above in view of the magnitude of leakage current. On the other hand, in order to satisfy the latter requirement, when the ratio of the capacitance of the holding capacitor to the capacitance of the signal line capacitor ($C_{SC}$:Cvideo) is 1:10 or above, a change in electric potential of the signal line may be reduced, for example, to around 1/10. Therefore, it is possible to sufficiently suppress a decrease in display quality.

Figure 8:
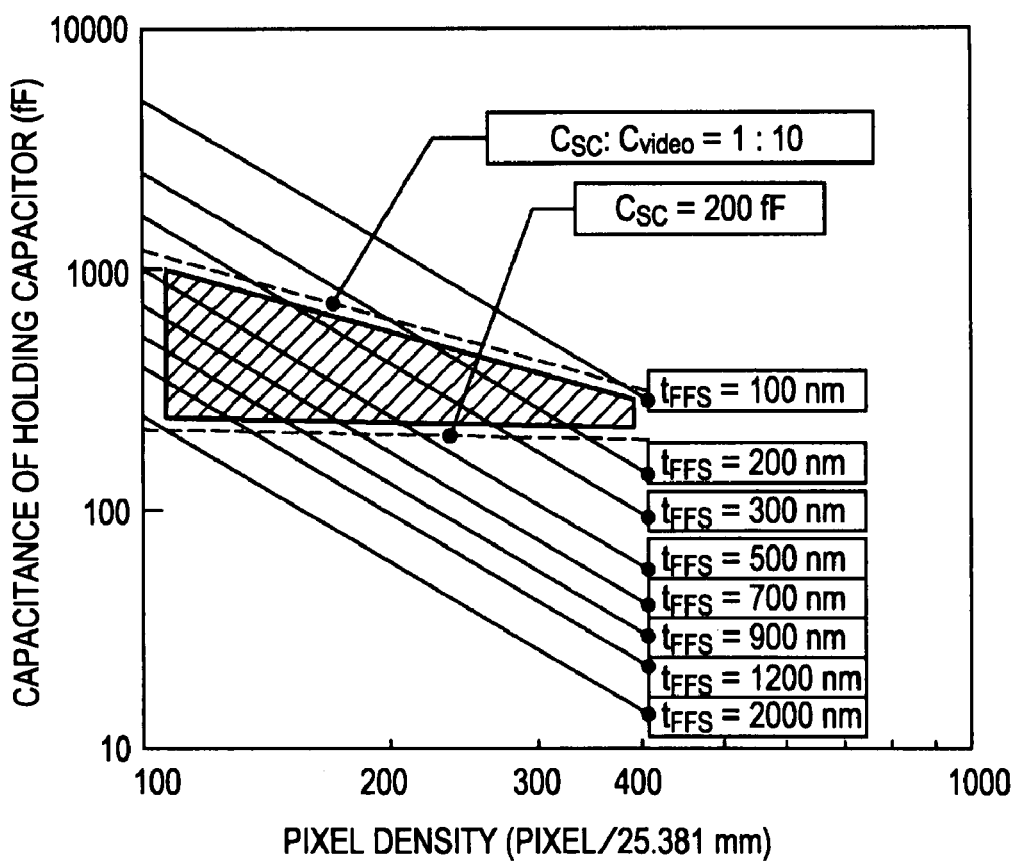
FIG. 8 is a graph showing a range of the thickness $t_{FFS}$ of an FFS insulating film, which satisfies two improvement conditions of a holding capacitor according to the embodiment of the invention.

FIG. 8 is a graph showing a range of the thickness $t_{FFS}$ of an FFS insulating film, which satisfies the above two conditions. That is, in FIG. 8 in which the abscissa axis represents a pixel density, the ordinate axis represents a capacitance of a holding capacitor, and a thickness of an FFS insulating film is used as a parameter, the line indicating the capacitance of the holding capacitor ($C_{SC}$)=200 fF and the line indicating the capacitance of the holding capacitor:the capacitance of the signal line capacitor ($C_{SC}$:Cvideo)=1:10 are shown by broken lines. The region indicated by diagonal lines and surrounded by the above two broken lines is a region in which the thickness $t_{FFS}$ of the FFS insulating film satisfies the above two conditions.

Here, the capacitance of the signal line capacitor corresponding to the pixel density P was calculated where the capacitance of intersection of the gate wiring and the drain wiring is $7.1\times10^{-17}$ fF/(μm)², the capacitance of intersection of the drain wiring and the common electrode is $7.1\times10^{-17}$ fF/(μm)², the width of the gate wiring and the width of the drain wiring both are 5 μm, and the total number of gate wirings, that is, the number of scanning lines is 240. In addition, $\epsilon_{FFS}$=6, L=S=4 μm.

Figure 9:
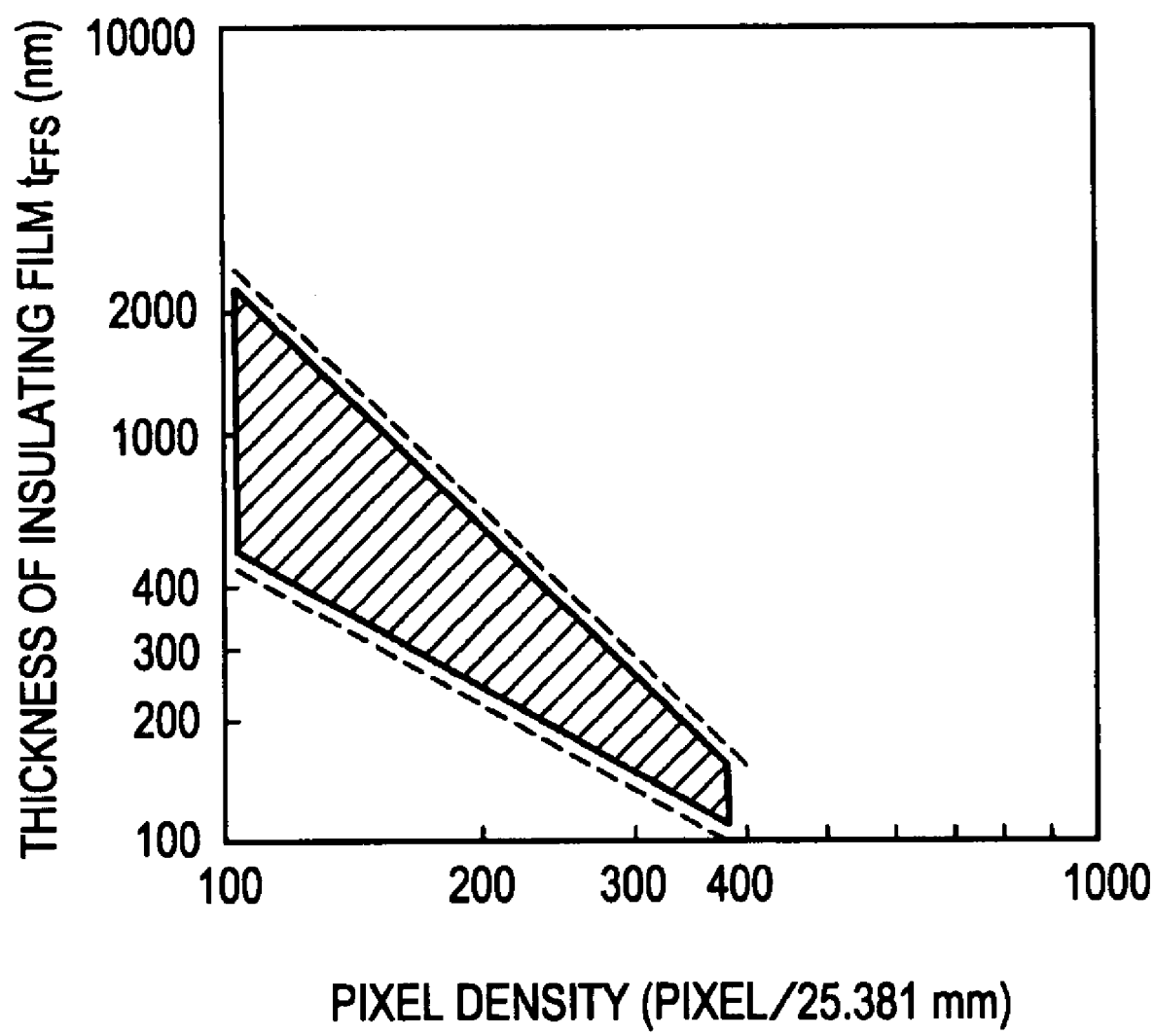
FIG. 9 is another graph showing a range of the thickness $t_{FFS}$ of an FFS insulating film, which satisfies two improvement conditions of a holding capacitor according to the embodiment of the invention.

FIG. 9 shows the contents of FIG. 8, that is, the region that satisfies the above two conditions, by diagonal lines when the abscissa axis represents a pixel density and the ordinate axis represents a thickness $t_{FFS}$ of an FFS insulating film. The results of FIG. 9 demonstrate the following. That is, it is desirable that the thickness of the FFS insulating film is set in the range of 90 nm to 2400 nm under the condition, when the pixel density P ranges from 100 to 400, that the first condition where the capacitance of the holding capacitor with respect to the pixel TFT exceeds 200 fF and the second condition where the capacitance of the signal line capacitor of the pixel TFT with respect to the drain wiring exceeds ten times of the capacitance of the holding capacitor both are fulfilled.

For example, the thickness of the FFS insulating film is desirably set as follows. When the pixel density P=100, the thickness of the FFS insulating film ranges from 430 nm to 2400 nm. When the pixel density P=200, the thickness of the FFS insulating film ranges from 200 nm to 600 nm. When the pixel density P=300, the thickness of the FFS insulating film ranges from 130 nm to 260 nm. When the pixel density P=400, the thickness of the FFS insulating film ranges from 90 nm to 140 nm.

Furthermore, a general setting condition of the thickness of the FFS insulating film may be shown. That is, because 200 fF of the first condition corresponds to the case where the channel width W of the pixel TFT is 2 µm, 200 (fF)/2 (µm) is used and modified into $C_{SC}/W=100\times10^{-9}$ (fF/m). Thus, the first condition will be $C_{SC}/W=(\epsilon_0\epsilon_{FFS}/t_{FFS})\times nLX/W > 100\times10^{-9}$ (fF/m). This left hand side, where L=S and nL=Y/2, $C_{SC}/W = (\epsilon_0\epsilon_{FFS}/Wt_{FFS})\times\{(0.025381/P)^2/6\}$. Therefore, it is possible to generally express the first condition as $t_{FFS} < [(\epsilon_0\epsilon/W)\{(0.025381/P)^2/6\}]/(100\times10^{-9})$.

In addition, because the second condition is a condition when the holding capacitor $C_{SC}$ is charged and written with data by means of the pixel TFT, it may be regarded as follows. That is, where the on resistance per unit channel width of the pixel TFT is $\rho_{ON}$, the period of time during which the gate wiring and drain wiring of the pixel TFT are simultaneously turned on is $\tau_{ON}$, and the correction parameter is k, because it is only necessary for the time constant of charging to be smaller than $\tau_{ON}$, it is possible to approximately express the second condition as $k\times\rho ON\times W\times C_{SC} < \tau_{ON}$. When the above conditions are applied to the actual liquid crystal display element, the value of k becomes around 2. Hence, it turns out that this value agrees with the result of the simulation. Then, the $C_{SC}$ in the above equation is generalized as in the case of the above, the second condition may be expressed as follows. That is, the left hand side of this equation will be:

$$k\times\rho_{ON}\times W\times(\epsilon_0\epsilon_{FFS}/t_{FFS})\times\{(0.025381/P)^2/6\}.$$

From this, the second condition may generally be expressed as:

$$t_{FFS} > [(\epsilon_0\epsilon/W)\times\{(0.025381/P)^2/6\}\times k\times\rho ON]/\tau_{ON}.$$

For example, where W=4 µm, pixel density P=200, $\rho_{ON}$=160 nsec, $\rho_{ON}$=0.66 Ω/µm, and k=1.7, the first condition will be $t_{FFS} < 366.9$ nm and the second condition will be $t_{FFS} > 250.2$ nm. Hence, these results agree with the results shown in FIG. 9.

What is claimed is:

1. An active matrix liquid crystal display device comprising:
 a pixel transistor;
 a wiring layer that is connected to the pixel transistor;
 a first insulating layer that is provided on the pixel transistor and the wiring layer;
 a lower electrode layer that is provided on the first insulating layer and used as one of a common electrode layer and a pixel electrode layer;
 a second insulating layer that is provided on the lower electrode layer; and
 an upper electrode layer that is provided on the second insulating layer and used as the other of the common electrode layer and the pixel electrode layer, wherein
 where a display pixel has a substantially square shape and is composed of a plurality of sub pixels, a pitch at which the display pixels are arranged vertically and a pitch at which the display pixel are arranged horizontally are respectively P per 25.381 mm, a channel width of the pixel transistor is W, the on resistance per unit channel width of the pixel transistor is $\rho_{ON}$, a period of time during which a gate line and drain line of the pixel transistor are simultaneously turned on is $\tau ON$, a relative dielectric constant of the second insulating layer $\epsilon$, a vacuum dielectric constant is $\epsilon_0$, and a correction parameter is k, the thickness t of the second insulating layer satisfies the following inequalities:

$$t < [(\epsilon_0\epsilon/W)\times\{(0.025381/P)^2/6\}]/(100\times10^{-9}); \text{ and}$$

$$t > [(\epsilon_0\epsilon/W)\times\{(0.025381/P)^2/6\}\times k\times\rho_{ON}]/\tau_{ON}, \text{ and}$$
 wherein
 liquid crystal molecules are driven by applying voltage between the upper electrode layer and the lower electrode layer.

2. The active matrix liquid crystal display device according to claim 1, wherein the first insulating layer is formed of transparent insulating resin, and the second insulating layer is formed of a silicon nitride that is produced in a low-temperature process.

3. The active matrix liquid crystal display device according to claim 1, wherein the upper electrode layer has a slit that has a closed shape.

4. The active matrix liquid crystal display device according to claim 1, wherein the upper electrode layer has an opening having a comb-shape.

5. The active matrix liquid crystal display device according to claim 1, wherein a capacitor is formed by the lower electrode layer, a second insulating layer formed on the lower electrode layer and the upper electrode layer formed on the second insulating layer.

6. The active matrix liquid crystal display device according to claim 1, wherein the upper electrode layer is a common electrode layer.

7. The active matrix liquid crystal display device according to claim 1, wherein the upper electrode layer is a pixel electrode layer.

8. An active matrix liquid crystal display device comprising:
 a pixel transistor;
 a wiring layer that is connected to the pixel transistor;
 a first insulating layer that is provided on the pixel transistor and the wiring layer;
 a lower electrode layer that is provided on the first insulating layer and is used as one of a common electrode layer and a pixel electrode layer;
 a second insulating layer that is provided on the lower electrode layer; and
 an upper electrode layer that is provided on the second insulating layer and is used as the other of the common electrode layer and the pixel electrode layer, wherein
 when a display pixel has a substantially square shape and is composed of a plurality of sub pixels, a pitch at which the display pixels are arranged vertically and a pitch at which the display pixel are arranged horizontally are respectively P per 25.381 mm, the thickness t of the second insulating layer ranges from 90 nm to 2400 nm under conditions that:
 a first condition where the capacitance of a pixel holding capacitor with respect to the pixel transistor exceeds 200 fF when the P ranges from 100 to 400 is satisfied, and
 a second condition where the capacitance of a signal line capacitor with respect to a drain line of the pixel transistor exceeds ten times the capacitance of the pixel holding capacitor is satisfied, and wherein liquid crystal molecules are driven by applying voltage between the upper electrode layer and the lower electrode layer.

9. The active matrix liquid crystal display device according to claim 8, wherein the first insulating layer is formed of transparent insulating resin, and the second insulating layer is formed of a silicon nitride that is produced in a low-temperature process.

10. The active matrix liquid crystal display device according to claim 8, wherein the upper electrode layer has a slit with a closed shape.

11. The active matrix liquid crystal display device according to claim 8, wherein the upper electrode layer has an opening having a comb-shape.

12. The active matrix liquid crystal display device according to claim 8, wherein the pixel holding capacitor is formed by the lower electrode layer, a second insulating layer formed on the lower electrode layer and the upper electrode layer formed on the second insulating layer.

13. The active matrix liquid crystal display device according to claim 8, wherein the upper electrode layer is a common electrode layer.

14. The active matrix liquid crystal display device according to claim 8, wherein the upper electrode layer is a pixel electrode layer.

15. An active matrix liquid crystal display device comprising:
   a two dimensional display pixel array having a plurality of display pixels with a pixel density P arranged in an X direction with a first pitch and a Y direction with a second pitch, each display pixel comprising:
   a pixel transistor connected to a gate line and drain line;
   a first insulating layer that is provided on the pixel transistor and the drain line;
   a second insulating layer that is provided on the lower electrode layer;
   a lower electrode layer that is provided between the first insulating layer and the second insulating layer and is used as one of a common electrode layer and a pixel electrode layer; and
   an upper electrode layer that is provided on the second insulating layer and used as the other of the common electrode layer and the pixel electrode layer,
   each display pixel having a substantially square shape and being composed of a plurality of sub pixels,
   the first pitch and the second pitch being respectively P per 25.381 mm,
   a pixel transistor having a channel width of W, and an on resistance per unit channel width of $\rho_{ON}$,
   a period of time during which the gate line and drain line of the pixel transistor are simultaneously turned on being $\tau_{ON}$,
   the second insulating layer having a relative dielectric constant of $\epsilon$, a vacuum dielectric constant of $\epsilon_0$, a correction parameter, and a thickness of t, the thickness t of the second insulating layer satisfies the following inequalities:

$$t<[(\epsilon_0\epsilon/W)\times\{(0.025381/P)^2/6\}]/(100\times10^{-9}); \text{ and}$$

$$t>[(\epsilon_0\epsilon/W)\times\{(0.025381/P)^2/6\}\times k\times\rho_{ON}]/\tau_{ON},$$

each pixel allowing application of a voltage between the upper electrode layer and the lower electrode layer to drive liquid crystal molecules.

16. An active matrix liquid crystal display device comprising:
   a two dimensional display pixel array having a plurality of display pixels with a pixel density P arranged in an X direction with a first pitch and a Y direction with a second pitch, each display pixel comprising:
   a pixel transistor connected to a scanning line and a signal line, the signal line having a signal line capacitor with a capacitance;
   a first insulating layer that is provided on the pixel transistor and the signal line;
   a second insulating layer that is provided on the lower electrode layer;
   a lower electrode layer that is provided between the first insulating layer and the second insulating layer and is used as one of a common electrode layer and a pixel electrode layer; and
   an upper electrode layer that is provided on the second insulating layer and above the first and second insulating layers and is used as the other of the common electrode layer and the pixel electrode layer,
   a portion of the upper electrode layer overlapping a portion of the lower electrode layer, thereby forming an overlap structure having a pixel holding capacitor with a capacitance,
   each display pixel having a substantially square shape and being composed of a plurality of sub pixels, the first pitch the second pitch being respectively P per 25.381 mm,
   the second insulating layer having a thickness t that ranges from 90 nm to 2400 nm under conditions that:
   the capacitance of the pixel holding capacitor with respect to the pixel transistor exceeds 200 fF when the P ranges from 100 to 400, and
   the capacitance of the signal line capacitor with respect to the signal line of the pixel transistor exceeds ten times the capacitance of the pixel holding capacitor each pixel allowing application of a voltage between the upper electrode layer and the lower electrode layer to drive liquid crystal molecules.

* * * * *